United States Patent

Peterson

[15] 3,678,388

[45] July 18, 1972

[54] GROUND STATION SYSTEM FOR RETRANSMITTING SATELLITE FACSIMILE SIGNALS OVER DIGITAL DATA LINKS

[72] Inventor: Reeve D. Peterson, San Diego, Calif.

[73] Assignee: The United States of America as repersented by the Secretary of the Navy

[22] Filed: Dec. 14, 1970

[21] Appl. No.: 97,862

[52] U.S. Cl. ..............................325/4, 178/DIG. 3, 325/38 R

[51] Int. Cl. ..........................................H04b 7/20, H04n 1/00

[58] Field of Search .......................178/2 E, DIG. 3, 6 R, 6.8; 325/4, 13, 38 R

[56] References Cited

UNITED STATES PATENTS 3,504,112 3/1970 Gruenberg........................178/DIG. 3

3,517,312 6/1970 Yamato et al. ............................325/4

3,585,586 6/1971 Harmon et al. ...................178/DIG. 3

*Primary Examiner*—Benedict V. Safourek

*Attorney*—R. S. Sciascia, George J. Rubens and J. W. McLaren

[57] ABSTRACT

A ground station system for digitally processing automatic-picture-transmission (APT) pictures transmitted by earth-orbiting satellites whereby the processed pictures can be re-transmitted over a digital data link to other remote receiving stations. At the transmit end of the system, APT pictures in the form of facsimile signals from satellites are sampled and gray-shade level quantized to produce a serial bit stream. The bit stream is re-transmitted over a digital data link to receiving stations where the received bit stream is suitably processed to thereby convert it to facsimile signals identical to the ones received directly from the satellite.

2 Claims, 1 Drawing Figure

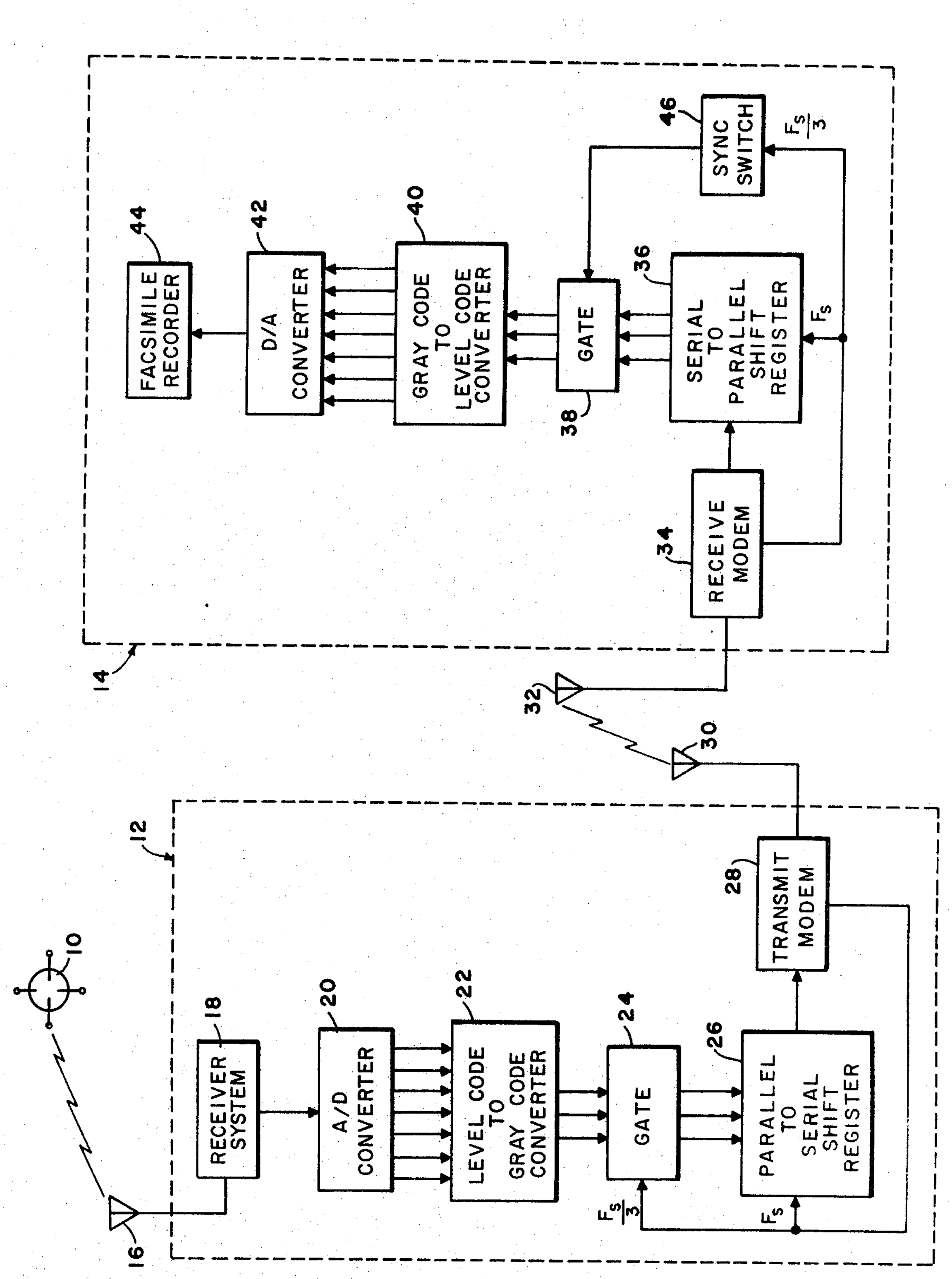
INVENTOR.
REEVE D. PETERSON
BY
ATTORNEYS

GROUND STATION SYSTEM FOR RETRANSMITTING SATELLITE FACSIMILE SIGNALS OVER DIGITAL DATA LINKS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The APT satellite system is a unique television system which enables weather satellites to take cloud cover pictures over wide areas and to transmit them to ground receiving stations. The transmitted pictures of cloud patterns signify weather conditions which are thus immediately observable at the receiving stations. A number of naval ships are equipped with APT receiving systems to provide the ships with weather data to improve meteorological interpretations in areas not normally served by weather bureaus. A problem, however, arises due to the fact that APT receiving systems aboard these ships often comprise relatively large and heavy equipments which take up undue amounts of space on the ships. Since space and weight are critical factors on naval ships, it can be appreciated that alternatives to direct reception of satellite information by shipborne APT receiving stations are urgently required. One possible alternative involves the re-transmission of satellite information to remote stations over digital data links. The unique and relatively simple invention to be disclosed herein comprises one such possible alternative.

SUMMARY OF THE INVENTION

A ground station system for digitally processing APT multi-gray level facsimile signals transmitted by satellites is disclosed. At the transmit end of the system, APT signals received from a satellite are sampled continuously and quantized to thereby produce gray-shade level coded digital signals. The digital signals are then Gray coded and re-transmitted as a serial bit stream over a digital data link to a number of remote receiving stations. At the remote receiving stations, the received serial bit stream is digitally processed to convert it to analog signals substantially identical to the facsimile pictures received directly from the satellite. The analog signals can be utilized by the receiving stations in the same manner as facsimile pictures received directly from the satellite.

OBJECTS OF THE INVENTION

The primary object of the present invention is to provide a ground station system for re-transmitting satellite APT cloud cover pictures over a digital data link to remote receiving stations.

Another object of the present invention is to provide a method for re-transmitting satellite facsimile signals to remote receiving stations as an alternative to direct reception of the signals by each of the stations.

Other objects, advantages and novel features of the invention will become apparent from the following detailed description of the invention when considered in conjunction with the accompanying drawings wherein:

BRIEF DESCRIPTION OF THE DRAWINGS

The FIGURE is a simplified schematic block diagram of a system for retransmitting satellite APT cloud cover pictures to remote stations over a digital data link.

DESCRIPTION OF THE PREFERRED EMBODIMENT

The figure is a simplified schematic block diagram of a system for re-transmitting APT cloud cover pictures over a digital data link to remote receiving stations. In the FIGURE, a weather satellite 10 which is in orbit around the earth is shown transmitting APT cloud cover pictures in the form of facsimile or analog signals. The signals are received at a central ground receiving station 12 which processes the signals in a manner to be described hereinafter whereby they can be re-transmitted over any kind of digital data link to remote receiving stations such as station 14. For purposes of explanation only one remote receiving station 14 is shown although it should be clearly understood that the system to be described would normally be used to provide satellite APT data to a plurality of receiving stations.

The system shown in the figure would normally receive multi-gray shade facsimile signals of the type illustrated and described in pending patent application, Ser. No. 53,046, entitled "An Electronic Phasing and Synchronizing Circuit for Facsimile Recorders," filed on July 8, 1970 by Scott D. Morton. Basically the signal comprises a baseband signal which is modulated on, for example, a 2,400 Hz carrier. A phasing bar which corresponds to the beginning of one line of the facsimile picture comprises a pulse of maximum level for approximately 12.5 ms which occurs every 250 ms. The video signal comprises a baseband signal having levels from DC to 800 Hz. Any frequency component above 500 Hz is defined as being small. The detected video signal carries the picture gray shade information. A high level corresponds to white and a low level corresponds to black. Timing is inherent in the 2,400 Hz carrier and each line of picture corresponds to 600 alternations of the carrier.

At the central ground station 12, satellite pictures are received by a receiving antenna 16 which could, for example, comprise a directional antenna. The received analog signals are fed to an FM receiver system 18 which can comprise a receiver system of the type disclosed in NASA Report SP-5080, "Weather Satellite Picture Receiving Stations," (1969).

The detected video output signals from the receiver system 18 are coupled to an analog-to-digital (A/D) converter 20 which continuously samples the signals and converts them into digital signals. A/D converter 20 is shown as comprising a direct level (amplitude) detector having an eight distinct signal level output corresponding to eight distinct gray shade levels which can be used to adequately describe most satellite facsimile pictures. Thus the output of the A/D converter comprises a seven-bit word which is coded in a suitable signal level code such as the exemplary code shown in the coding scheme of Table I below:

TABLE I

| Facsimile Signal Level | Level code A | B | C | D | E | F | G | Gray Code | Binary Code |
|---|---|---|---|---|---|---|---|---|---|
| 0 | 0 | 0 | 0 | 0 | 0 | 0 | 0 | 000 | 000 |
| 1 | 0 | 0 | 0 | 0 | 0 | 0 | 1 | 001 | 001 |
| 2 | 0 | 0 | 0 | 0 | 0 | 1 | 1 | 011 | 010 |
| 3 | 0 | 0 | 0 | 0 | 1 | 1 | 1 | 010 | 011 |
| 4 | 0 | 0 | 0 | 1 | 1 | 1 | 1 | 110 | 100 |
| 5 | 0 | 0 | 1 | 1 | 1 | 1 | 1 | 111 | 101 |
| 6 | 0 | 1 | 1 | 1 | 1 | 1 | 1 | 101 | 110 |
| 7 | 1 | 1 | 1 | 1 | 1 | 1 | 1 | 100 | 111 |

For example, from Table I, it can be seen that if a received facsimile signal has an amplitude gray-shade level corresponding to level 2, the A/D converter 20 will output the seven-bit word 0 0 0 0 0 1 1. Likewise, if an amplitude level corresponding to level 7 is detected in the A/D converter 20, it will output the seven-bit word 1 1 1 1 1 1 1.

The seven-bit word output from the A/D converter 20 is fed to the level code-to-Gray code converter 22 which converts the seven-bit word into a three-bit Gray code word using conventional digital circuitry and techniques. For example, again referring to Table I, it can be seen that the seven-bit word 0 0 0 0 0 1 1 is converted into the three-bit word 011, and the seven-bit word 1 1 1 1 1 1 1 is converted into the three-bit word 100.

The three-bit Gray code output from the level code-to-Gray code converter 22 is gated by the digital gate 24 at a selectively predetermined clock rate to the parallel-to-serial shift register 26. For example, in the figure, the gate 24 is shown as gating data at a rate equal to $F_s/3$, i.e., every third clock pulse, where $F_s$ is the clock rate.

The three-bit Gray code word is converted in the shift register 26 into a serial bit stream having a binary code as shown in Table I. For example, once more referring to Table I, it can be seen that the three-bit Gray code word 011 is converted into the serial bit stream 010, and three-bit Gray code word 100 is converted into the serial bit stream 111.

It can be appreciated by those skilled in the art that the gate 16 and the shift register 18 function together as a buffer shift register or buffer storage.

The serial bit stream is clocked out of the parallel-to-serial shift register 26 at the clock rate $F_s$ and coupled to a transmit modem 28 of a digital data link which can comprise any one of various well-known digital data links such as RF data links.

It can be seen that the clock pulses and timing signals are provided by a clock source (not shown) in the transmit modem 28. The transmit modem 28 transmits the serial data over the digital data link by means of the antenna 30.

The receiving antenna 32 receives the transmitted serial data and couples it to the receive modem 34 which is located at the remote receiving station 14. The modem 34 feeds the received serial bit stream to a serial-to-parallel shift register 36 which converts the data stream into a three-bit Gray code word as discussed previously.

The three-bit Gray code is clocked out of the shift register 36 at the clock rate $F_s$ to the digital gate 38. The gate 38 transfers the three-bit Gray code word every third clock pulse to the Gray code-to-level code converter 40.

Again it can be appreciated that the shift register 36 and the gate 38 function together as a buffer register or buffer storage.

The converter 40 converts the three-bit Gray code word into a seven-bit word which is level coded as shown in Table I. The seven-bit word output from the level code-to-Gray code converter 40 is then fed to an analog-to-digital (A/D) converter which decodes the word and converts it into an analog signal which is substantially equal to the facsimile cloud cover picture being transmitted by the satellite 10.

The output of the A/D converter 42 can then be coupled to a facsimile recorder 44 or any other suitable display device.

Again it can be seen that the clock pulses and timing signals are provided by a clock source (not shown) in the receive modem 34.

Synchronization (i.e., grouping) of each three-bit word from the shift register 36 can be achieved by using an automatic synchronizer. However, in the figure, word synchronization is achieved by means of a simple synchronizing switch 46 which is connected between the clock output of the receive modem 34 and the digital gate 38. In operation, the received signal is observed visually and the switch 46 is used to inhibit the clock pulse to the gate 38 until word synchronization is visually observed.

A Gray code is utilized in the system because the digital data can be made continuous in a single-step manner. For example, if the facsimile signal received from the satellite 10 has an amplitude level at the boundary between two quantized levels, the digital data will be ambiguous in one bit only. In binary or other existing types of coding, a change in a single level could result in an ambiguity in more than one bit.

For example, by referring to Table I and by assuming that the facsimile signal gray-shade amplitude level is at the boundary between level 3 and level 4 when it is sampled, it can be seen that bit D in the level code will be in doubt and perhaps will toggle back and forth. When this occurs, the binary code will toggle in all three bits. If the binary code is sampled when all three bits are changing, the value of the sample can assume any value and will in fact depend on the switching speed of flip-flops which are used in the sampling circuits.

If Gray code is used, however, and bit D in the same level code is toggling, then only one bit in the Gray code is toggling and the code will be decoded into either level three or level four.

As can be seen the A/D converter 20 samples the analog signal digitally whereby the analog signal is continuously converted into a digital signal. Thus at any instant in time the digital output reflects the input analog signal. Consequently a short pulse in the order of one microsecond is generated to transfer the digital output of the A/D converter to the output shift register 26. The net effect of this process is to sample the input analog waveform but to accomplish it with digital circuitry. It can be appreciated that this method is not operable with a feedback type A/D converter which requires a definite length of time to convert an analog sample voltage into a digital voltage. Such a circuit would require a sample-and-hold circuitry.

Thus it can be seen and appreciated that a new and novel system for digitizing satellite facsimile signals at a central receiving station for subsequent re-transmission over a digital data link to various remote receiving stations is disclosed. The system comprises a relatively simple and effective alternative to direct reception of the satellite signals by the remote stations. The system can be built using low-power, reliable integrated circuits which have size, weight and cost advantages where space is at a premium such as on naval ships.

Obviously many modifications and variations of the present invention are possible in the light of the above teachings. It is therefore to be understood that within the scope of the appended claims the invention may be practiced otherwise than as specifically described.

What is claimed is:

1. A method for transmitting a satellite facsimile picture which can be represented by a selectively predetermined number of distinct gray shade levels from a central ground station over a digital data link to a plurality of remote ground stations comprising the steps of:
- at the central ground station:
  - receiving and detecting said facsimile picture,
  - level coding said facsimile picture by continuously sampling and level detecting said facsimile picture to produce a level code digital word representative of the gray shade level detected,
  - Gray coding said level-code digital word to convert said digital word into a Gray coded digital word,
  - converting said Gray code digital word into a selectively predetermined serial bit stream, and,
  - transmitting said serial bit stream over a digital data link to a plurality of remote ground stations;
- at each remote ground station:
  - receiving said serial bit stream;
  - converting said serial bit stream into said Gray code digital word,
  - converting said Gray code digital word into said level-code digital word, and,
  - converting said level-code digital word into an analog signal substantially identical to said facsimile picture.

2. A system for transmitting a multi-gray shade level facsimile picture, from an earth orbiting satellite, over a digital data link to a plurality of remote ground stations comprising:
- a central receiving ground station including receiver means for receiving and detecting said facsimile picture, and further including first processing means responsive to said multi-gray shade level facsimile picture to produce a selectively predetermined serial bit stream,
- said first processing means comprising analog-to-digital means responsive to the output of said receiver output for producing a level-coded digital signal corresponding to the gray-shade level of said facsimile picture,
- first converter means responsive to said level-coded digital signal for producing a Gray-coded signal corresponding to said level-coded digital signal, and, first buffer shift register means responsive to said Gray-coded signal to produce a serial bit stream at a selectively predetermined clock rate, digital transmit modem means connected to the output of said buffer storage means for transmitting said serial bit stream to said plurality of ground stations over a digital data link;

each of said ground stations including digital receive modem means for receiving said serial bit stream, and further including second processing means responsive to said serial bit stream to produce an analog signal substantially identical to said multi-gray shade level facsimile signal from said satellite, said second processing means including second buffer storage means responsive to the output of said receiver modem means to reproduce said Gray-coded signal, second converter means responsive to the reproduced Gray-coded signal to reproduce said level-coded digital signal, and, digital-to-analog converter means responsive to the reproduced level-coded digital signal to produce said analog signal substantially identical to said facsimile signal.

* * * * *